(12) United States Patent
Kumar

(10) Patent No.: US 9,095,117 B1
(45) Date of Patent: Aug. 4, 2015

(54) PET FEEDING SYSTEM

(76) Inventor: Sivathanu B. Kumar, Tampa, FL (US)

( * ) Notice: Subject to any disclaimer, the term of this patent is extended or adjusted under 35 U.S.C. 154(b) by 54 days.

(21) Appl. No.: 13/449,510

(22) Filed: Apr. 18, 2012

Related U.S. Application Data

(60) Provisional application No. 61/517,452, filed on Apr. 20, 2011.

(51) Int. Cl.
*A01K 5/01* (2006.01)

(52) U.S. Cl.
CPC .......................................... *A01K 5/01* (2013.01)

(58) Field of Classification Search
USPC .................................. 119/61.5, 61.54, 61.53
See application file for complete search history.

(56) References Cited

U.S. PATENT DOCUMENTS

| | | | | |
|---|---|---|---|---|
| 2,813,509 A * | 11/1957 | Bruno | ........................ | 119/51.01 |
| 4,348,988 A * | 9/1982 | Lawson | ........................ | 119/53 |
| 4,399,772 A * | 8/1983 | Salinas | ........................ | 119/51.5 |
| 4,658,759 A * | 4/1987 | Brown | ........................ | 119/61.5 |
| 4,880,112 A * | 11/1989 | Conrad | ........................ | 206/216 |
| 5,467,738 A * | 11/1995 | Cass | ........................ | 119/61.53 |
| 5,560,316 A * | 10/1996 | Lillelund et al. | ............. | 119/61.5 |
| 5,996,531 A * | 12/1999 | Anderson | ................. | 119/61.53 |
| 7,341,019 B1 * | 3/2008 | Tsengas | ........................ | 119/61.5 |
| 2003/0106498 A1 * | 6/2003 | Mersits et al. | ................... | 119/61 |
| 2005/0115508 A1 * | 6/2005 | Little | ........................ | 119/61.5 |
| 2006/0075974 A1 * | 4/2006 | Kennedy | ..................... | 119/61.5 |
| 2007/0137586 A1 * | 6/2007 | Park | ........................... | 119/57.1 |
| 2008/0190372 A1 * | 8/2008 | Horvath | ..................... | 119/61.56 |
| 2010/0162961 A1 * | 7/2010 | Hove et al. | ..................... | 119/51.5 |

* cited by examiner

*Primary Examiner* — Christopher P Ellis

(57) ABSTRACT

A container, a container-positioning stand, and a pan are provided. The pan is provided beneath the container and stand for containing liquid spills. The pan has primary spacers above forming a primary space and secondary spacers below forming a secondary space. The container has a generally cylindrical configuration with an annular lip. The stand has an annular top member removably receiving the container. The stand has downwardly extending legs.

1 Claim, 4 Drawing Sheets

US 9,095,117 B1

PET FEEDING SYSTEM

RELATED APPLICATION

The present application is based upon provisional Patent Application No. 61/517,452 filed Apr. 20, 2011, the subject matter of which is incorporated herein by reference.

BACKGROUND OF THE INVENTION

Field of the Invention

The present invention relates to a pet feeding system and more particularly pertains to providing fresh water and food to a pet, the providing being done in a clean, hygienic, safe, convenient and economical manner.

SUMMARY OF THE INVENTION

In view of the disadvantages inherent in the known types of feeding systems of known designs and configurations now present in the prior art, the present invention provides an improved pet feeding system. As such, the general purpose of the present invention, which will be described subsequently in greater detail, is to provide a new and improved pet feeding system and method which has all the advantages of the prior art and none of the disadvantages.

To attain this, the present invention essentially comprises a pet feeding system. A container, a container-positioning stand, and a pan are provided. The pan is provided beneath the container and stand for containing liquid spills. The pan has primary spacers above forming a primary space and secondary spacers below forming a secondary space. The container has a generally cylindrical configuration with an annular lip. The stand has an annular top member removably receiving the container. The stand has downwardly extending legs.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet feeding system which has all of the advantages of the prior art feeding systems of known designs and configurations and none of the disadvantages.

It is another object of the present invention to provide a new and improved pet feeding system which may be easily and efficiently manufactured and marketed.

It is further object of the present invention to provide a new and improved pet feeding system which is of durable and reliable constructions.

An even further object of the present invention is to provide a new and improved pet feeding system which is susceptible of a low cost of manufacture with regard to both materials and labor, and which accordingly is then susceptible of low prices of sale to the consuming public, thereby making such pet feeding system economically available to the buying public.

Even still another object of the present invention is to provide a pet feeding system for providing fresh water and food to a pet, the providing being done in a clean, hygienic, safe, convenient and economical manner.

Lastly, it is an object of the present invention to provide a new and improved pet feeding system. A container, a container-positioning stand, and a pan are provided. The pan is provided beneath the container and stand for containing liquid spills. The pan has primary spacers above forming a primary space and secondary spacers below forming a secondary space. The container has a generally cylindrical configuration with an annular lip. The stand has an annular top member removably receiving the container. The stand has downwardly extending legs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
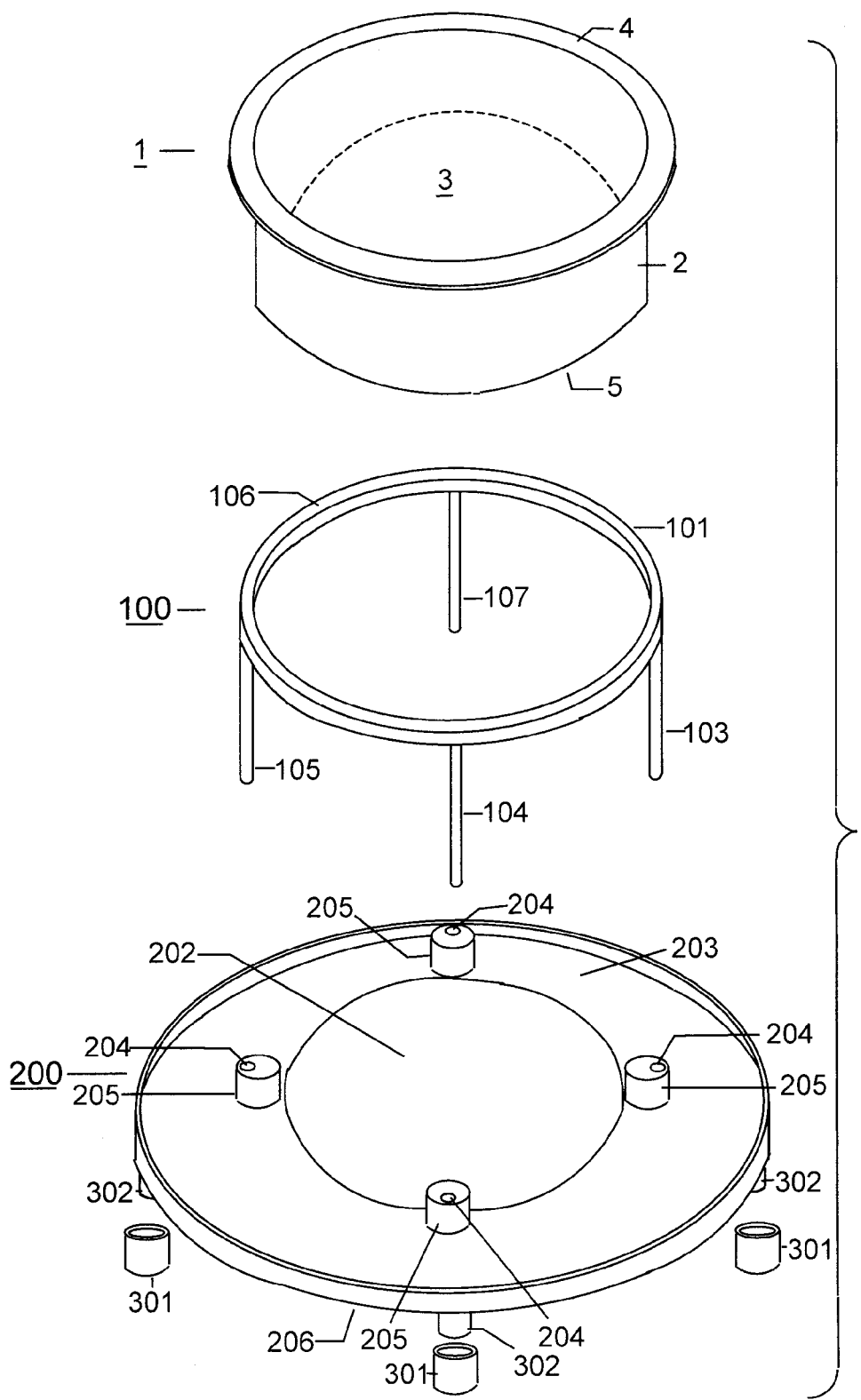
FIG. 1 is an exploded perspective illustration of a pet feeding system constructed in accordance with the principles of the present invention.
Figure 2:
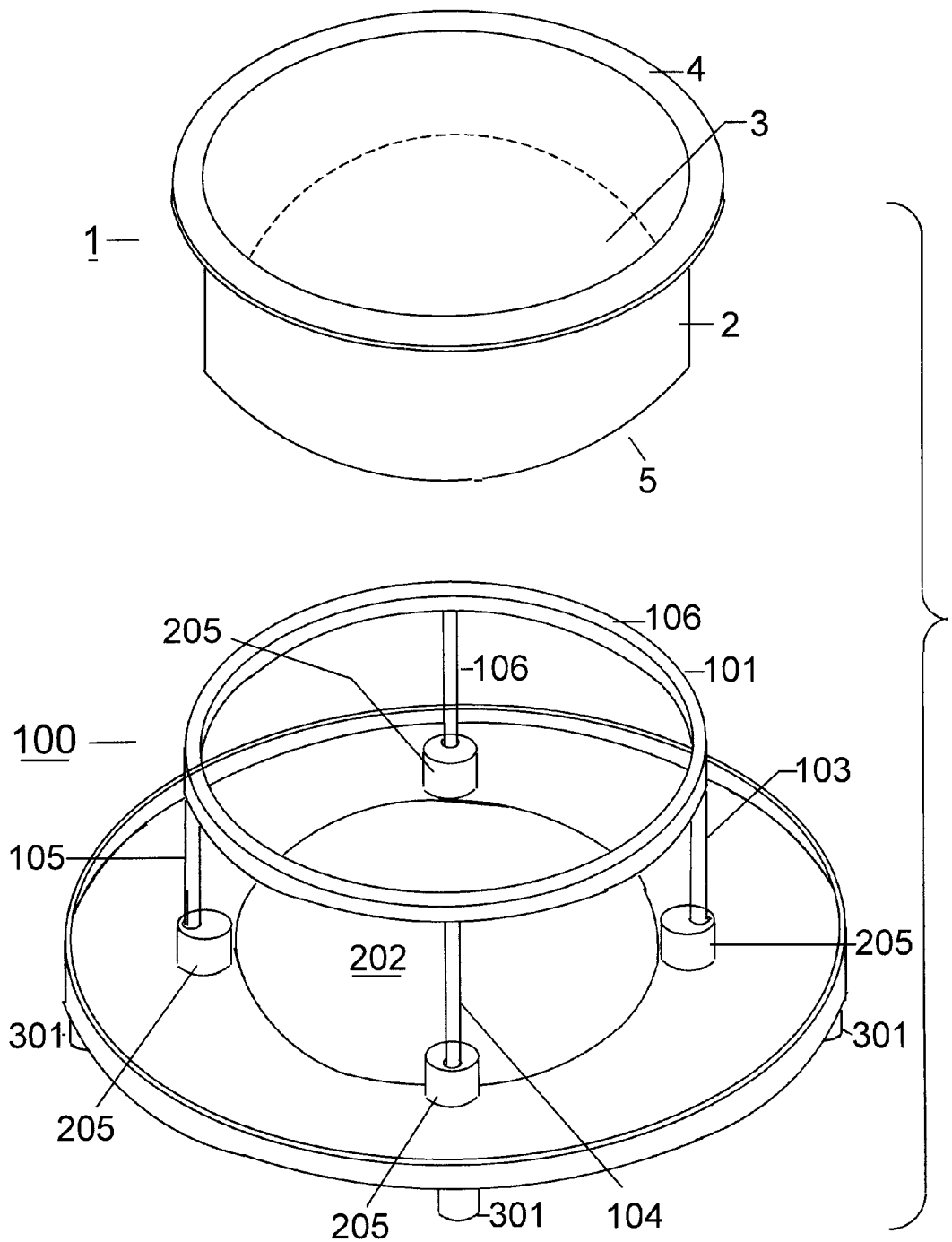
FIG. 2 is an exploded perspective illustration similar to FIG. 1 but with the stand and pan coupled.
Figure 3:
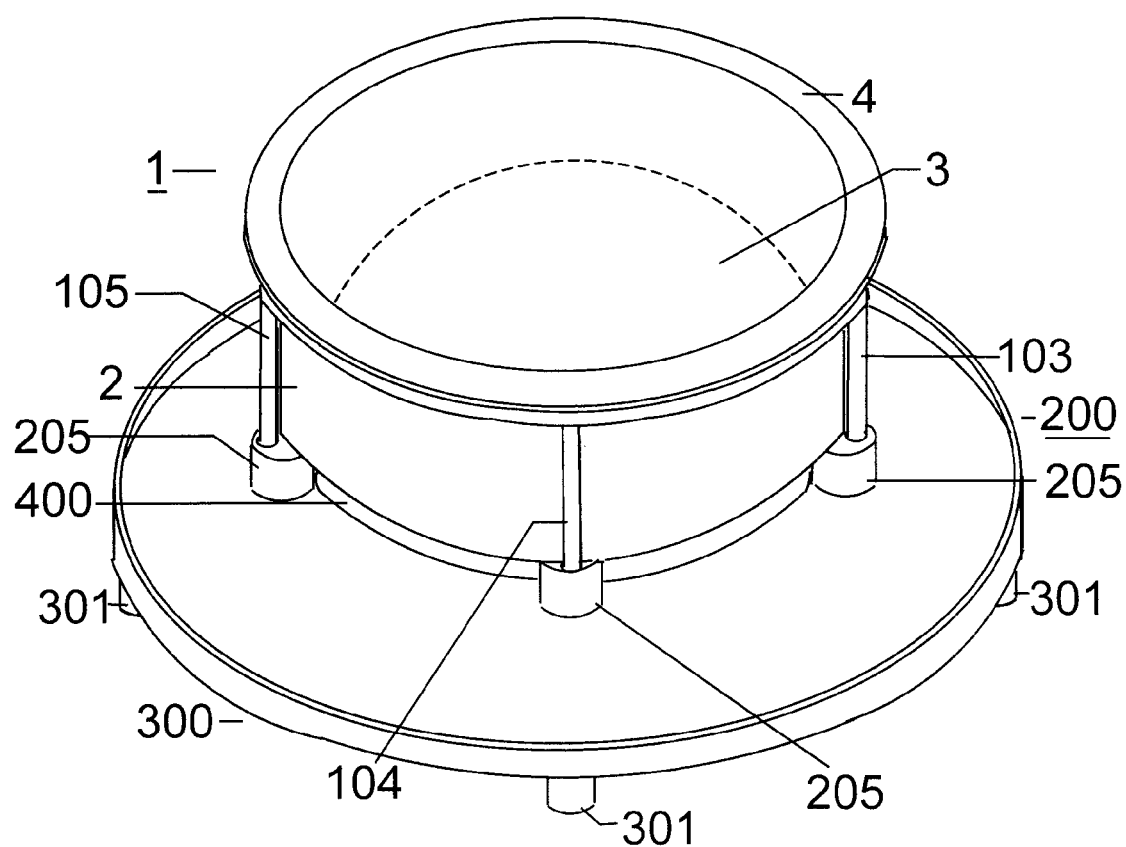
FIG. 3 is a vertical cross sectional view through the system with the three major component coupled.
Figure 4:
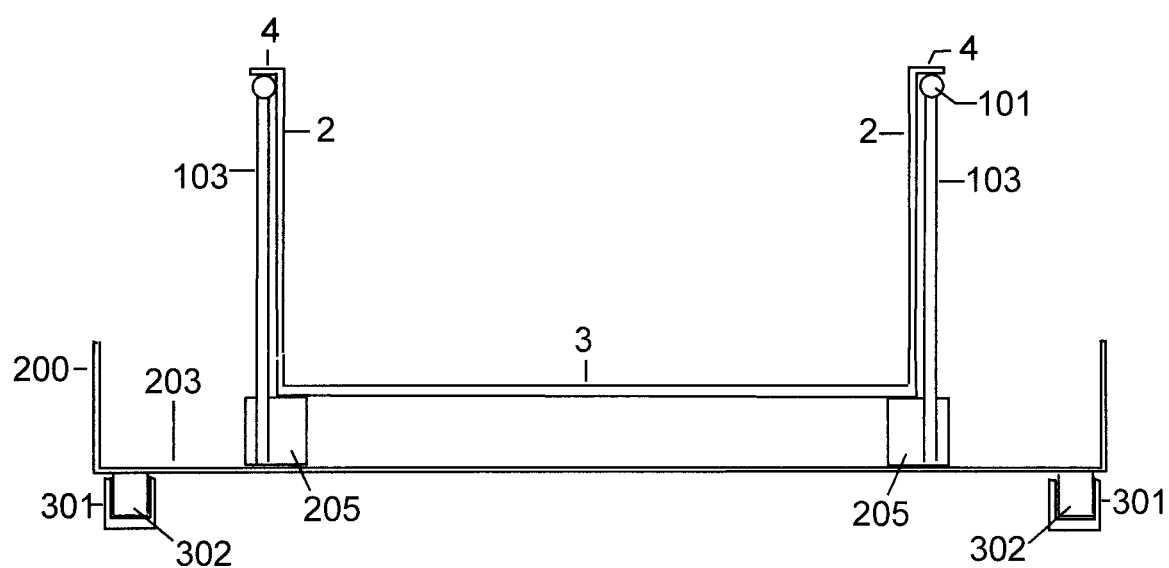
FIG. 4 is a perspective illustration similar to FIGS. 1 and 2 but with the container and stand and pan coupled.

With reference now to the drawings, and in particular to FIG. 1 thereof, the preferred embodiment of the new and improved pet feeding system embodying the principles and concepts of the present invention and generally designated by the reference numeral 1 will be described.

The present invention, the pet feeding system 10 is comprised of a plurality of components. Such components in their broadest context include a container, a container-positioning stand, and a pan. Such components are individually configured and correlated with respect to each other so as to attain the desired objective.

First provided is a container 1. A container-positioning stand 100 is provided. A pan 200 is also provided. The pan generally contains liquid spills.

The pan has primary spacers 205 above and secondary spacers 302 below. The primary spacers and the secondary spacers are adapted to provide primary and secondary spaces. The pan and the container have horizontal dimensions. The horizontal dimension of the pan is generally greater than the horizontal dimension of the container. The pan is adapted to receive and contain liquids spilled over from the container.

The primary spacers 205 are adapted to provide a primary aeration space between the bottom surface of the container 1 and the top surface 203 of the pan 200.

The secondary spacers 302 are adapted to provide a secondary aeration space between the pan and a recipient surface on which this system is positioned. The top surface 203 of the pan is adapted to receive and contain liquids spilled over from the container to the pan.

The primary aeration space is adapted to have the means to accelerate the drying of the liquid spills. In this manner the quicker drying of liquid spills is hastened.

The secondary aeration space is adapted to have the means to aerate and accelerate the drying of the liquid spills. In this manner the quicker drying of liquid spills is hastened.

The pan 200 is adapted to primarily contain liquid spill over from the container, such liquid spill generally caused by animals/pets feeding from the container.

The container has a generally cylindrical configuration. The container has a left, a right, a back and a front upstanding wall. The container has a bottom and an open top. The open top has top edges and a horizontally oriented annular lip 4. The annular lip is fixedly abutted against the top edges of the upstanding walls of the container.

The stand has an annular top member 101. The top member has an downwardly extending leg component 103, 104, 105, 106. The leg component is fixedly abutted against the lower surface of the annular top member 101.

The primary spacers 205 have indentation/holes 204. In this manner the leg sections of the container-positioning stand may be removably received. The pan further has secondary spacer components 302. The spacer components are provided along the periphery of the bottom edges of the bottom surface of the pan. Generally half of a middle section 202 of the upper surface of the bottom of the pan is curved upwards in a generally hemispherical configuration.

Cylindrical leg extensions 301 are provided. The leg extensions are adapted to receive the secondary spacers. The leg extensions are also adapted to enable the increase and decrease of the height of the secondary space and further. The leg extensions are further adapted to be compatible with various surfaces and textures the system is placed on. The greater horizontal dimension of the pan is adapted to receive liquid spilled from the container and open space between the bottom surface of the container and the top surface of the bottom of the pan. The top surface of the bottom of the pan is adapted to facilitate aeration and thus quicker drying of the fluids/liquids which are spilled from the container.

The components of the current invention hasten the drying of spilled fluids and liquids around a pet feeding container for improved hygiene and cleanness. This pet feeding system consisting of at least a container 1, a container-positioning stand 100 and a pan 200. The pan is for generally containing liquid spills and includes primary spacers 205 above and secondary spacers 302 below. This primary spacers 205 are adapted to provide the space between the bottom surface 5 of the container and the top surface of the pan. The secondary spacers 302 are adapted to provide the space between the bottom 206 of the pan and a top surface of a recipient surface on which this system is positioned. The recipient surface is but not limited to a floor of a home.

Primary aeration spaces are provided by the primary spacers and are adapted to have the means to aerate and accelerate the drying of the liquid spills from the container and thus hasten quicker drying of liquid spills.

Secondary aeration spaces are provided by the primary spacers and are adapted to have the means to aerate and accelerate the drying of the liquid spills from the pan and thus hasten quicker drying of liquid spills.

This system is further adapted to have the primary and or secondary aeration means or spaces.

The pan 200 is adapted to primarily receive and contain the liquid spill over from the container.

The container 1 generally is cylindrical in configuration having a left, a right, a back and a front upstanding wall 2, horizontal bottom 3 and an open top, the top edges of the upstanding walls have a horizontally oriented annular lip 4 section fixedly abutting against the upper edges of the upstanding walls 2 of the container.

The container-positioning stand 100 has an annular top member 101 and further having downwardly extending legs 103, 104, 105 and 106 fixedly abutting against the lower surface of the annular top member 101.

The pan 200 generally has a circular configuration with a left, a right, a back and front upstanding wall 201 with top edges. The pan 200 has bottom 206 with an open top. The pan has cylindrical upstanding primary spacers 205. The bottoms of the primary spacers are fixedly abutting against the top surface of the pan. The top surface of the upstanding primary spacers has indentation/holes 204. These indentation/holes removably receive the legs of the container-positioning stand 100. The pan 200 further has downwardly extending, laterally positioned secondary spacers 302 along the periphery of the bottom edges of the bottom 206 of the pan.

Generally the middle section 202 of the upper surface of the bottom of the pan directly below the container being curved upwards in a generally hemispherical configuration.

The horizontal dimension of the pan is generally greater than that of the horizontal dimension of the container. The greater horizontal dimension of the pan is adapted to collects such liquid spills for aeration and quicker drying.

This system further has cylindrical leg extensions 301 adapted receive the secondary spacers and thus enabling of the increase or decrease the height of the secondary space. The extensions are further adapted to be compatible with various surfaces and textures upon which these system are placed.

As the pets using this system are of different species, sizes, shapes, habits and personalities it is with in the scope of this invention to alter, modify, omit or add or to design and vary shape and size components in part or as whole to meet such varied needs and demands to suit such pets, in keeping with and not deviating from the sprit of this invention.

It is understood that the terms and descriptions such as but not limited to sides and position used to describe this invention are used to describe the details and functions of this invention and should not be construed to be limiting.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pet feeding system for providing fresh water and food to a pet, the providing being done in a clean, hygienic, safe, convenient and economical manner, the system comprising, in combination:

a container (1), a container-positioning stand (100), and a pan (200) for generally containing liquid spills;

the pan having primary spacers (205) secured to and extending upwardly from the pan, the pan having secondary spacers (302) secured to and extending downwardly from the pan, the primary spacers and the secondary spacers adapted to provide primary and secondary spaces, the pan and the container having horizontal dimensions with the horizontal dimension of the pan being generally greater than the horizontal dimension of the container, the pan adapted to receive and contain liquids spilled over from the container;

the primary spacers (205) adapted to provide a primary aeration space between the bottom surface of the container (1) and the top surface (203) of the pan (200);

the secondary spacers (302) adapted to provide a secondary aeration space between the pan and a recipient surface on which this system is positioned, the top surface (203) of the pan adapted to receive and contain liquids spilled over from the container to the pan;

the primary aeration space being adapted to have the means to accelerate the drying of the liquid spills and thus hastening the quicker drying of liquid spills;

the secondary aeration space being adapted to have the means to aerate and accelerate the drying of the liquid spills and thus hastening the quicker drying of liquid spills;

the pan (200) adapted to primarily contain liquid spill over from the container, such liquid spill generally caused by animals/pets feeding from the container;

the container having a generally cylindrical configuration having a left, a right, a back and a front upstanding wall, a bottom and an open top, the open top having top edges and a horizontally oriented annular lip (4) fixedly abutting against the top edges of the upstanding walls of the container;

the stand having an annular top member (101) with downwardly extending leg component (103), (104), (105), (106) fixedly abutting against the lower surface of the annular top member (101);

the primary spacers (205) having indentation/holes (204) to removably receive the leg sections of the container-positioning stand, the pan further having secondary spacer components (302) along the periphery of the bottom edges of the bottom surface of the pan, generally half of a middle section (202) of the upper surface of the bottom of the pan being curved upwards in a generally hemispherical configuration;

a cylindrical leg extensions (301) adapted to removably receive the secondary spacers and enabling of the increase and decrease the height of the secondary space and further adapted to be compatible with various surfaces and textures the system is placed on, the greater horizontal dimension of the pan being adapted to receive liquid spilled from the container and open space between the bottom surface of the container and the top surface of the bottom of the pan adapted to facilitate aeration and thus quicker drying of the fluids/liquids which are spilled from the container.

* * * * *